United States Patent
DeVries

(10) Patent No.: US 10,081,543 B2
(45) Date of Patent: Sep. 25, 2018

(54) INTEGRATED REFORMER AND PURIFIER

(71) Applicant: HORIZON FUEL CELL TECHNOLOGIES PTE LTD., Singapore (SG)

(72) Inventor: Peter David DeVries, Shanghai (CN)

(73) Assignee: HORIZON FUEL CELL TECHNOLOGIES PTE. LTD., Singapore (SG)

( * ) Notice: Subject to any disclaimer, the term of this patent is extended or adjusted under 35 U.S.C. 154(b) by 132 days.

(21) Appl. No.: 14/921,609

(22) Filed: Oct. 23, 2015

(65) Prior Publication Data
US 2017/0113931 A1    Apr. 27, 2017

(51) Int. Cl.
*C01B 3/50*    (2006.01)
*B01J 8/02*    (2006.01)

(52) U.S. Cl.
CPC ............ *C01B 3/508* (2013.01); *B01J 8/0285* (2013.01); *B01J 2208/00504* (2013.01); *C01B 2203/0227* (2013.01); *C01B 2203/041* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,033,634 A * | 3/2000 | Koga | .................... | B01J 8/0285 422/198 |
| 6,348,278 B1 * | 2/2002 | LaPierre | ................ | B01B 1/005 422/198 |
| 7,182,917 B2 * | 2/2007 | Krueger | ................ | B01D 53/22 422/129 |
| 7,393,389 B2 * | 7/2008 | Maus | ................... | H01M 8/0247 429/434 |
| 9,017,436 B2 * | 4/2015 | Chen | ...................... | H01M 6/44 48/127.9 |
| 2006/0233700 A1 * | 10/2006 | Chellappa | ........... | B01J 19/0093 423/648.1 |
| 2007/0087235 A1 * | 4/2007 | Kim | ................... | H01M 8/0271 429/425 |

* cited by examiner

*Primary Examiner* — Kaity V Chandler
(74) *Attorney, Agent, or Firm* — Rhodes IP PLC; Christopher R Rhodes

(57) ABSTRACT

A combined reformer and purifier for converting a hydrogen-rich feedstock into purified hydrogen is described. The combined reformer and purifier can include at least one compression plate as an assembly comprising at least one first cavity comprising a catalyst effective to liberate hydrogen from said hydrogen-rich feedstock and forming a hydrogen-rich mixed gas. The compression plate assembly can also include at least one second cavity enclosing a burner or oxidative catalytic reactor to oxidize said hydrogen-depleted raffinate or said hydrogen-rich feedstock to supply heat to the at least one first cavity containing said catalyst. The compression plate assembly can also include an interior surface proximal to said membrane and an exterior surface distal to said membrane. The compression plate assembly can also include a third cavity effective to preheat said hydrogen-rich feedstock prior to being delivered to said catalyst.

9 Claims, 4 Drawing Sheets

Fig. 3

INTEGRATED REFORMER AND PURIFIER

TECHNOLOGICAL FIELD

Certain configurations described herein relate to a reformer that is operative to liberate hydrogen gas from a hydrogen-rich feedstock in a catalytic reforming reaction, where a hydrogen purifier is effective to remove and purify hydrogen gas, in a thermally integrated assembly combining the reformer and purifier. A multi-cavity reforming assembly is also disclosed which may, for example, comprises a close-ended cavity burner for supplying heat, a catalyst bed, methanation catalyst, standby heaters, an ignition source, and a hydrogen-permeable membrane purifier. The multi-cavity reforming assembly also serves as a compression plate in the purifier assembly.

BACKGROUND

Hydrogen can be used as a fuel source by many different devices. The hydrogen is typically introduced into the device from a gas source or reservoir.

SUMMARY

In one aspect, a combined reformer and purifier comprise a compression member configured in one embodiment to form multiple cavities for reforming catalyst, a burner or a burner gas utilizing a single-ended cavity, a methanation catalyst, and for boiling and preheating incoming feedstock (fuel), where the compression member, combined with a second compression member, compressively seals one or more hydrogen-permeable membranes between the two compression members. To further improve the heat transfer between the cavities, in certain configurations it is also envisioned to provide a secondary heat transfer member made out of a highly heat-conductive material. In another embodiment, a metallic block is configured to form cavities for reforming catalyst, a burner or burner gas utilizing a single-ended cavity, a methanation catalyst, boiling and preheating incoming feedstock (fuel), and one or more hydrogen permeable membranes. In both embodiments, heat is transmitted between the cavities via the compression member or metallic block, forming a compact, thermally and mechanically integrated structure. Certain embodiments described herein provide an improved device for producing purified hydrogen, which may be consumed, for example, in a fuel cell system for the production of electrical power. By utilizing a close-ended cavity for the burner, the device may be made in a more compact and economical fashion.

In another aspect, a combined reformer and purifier for converting a hydrogen-rich feedstock into purified hydrogen is provided. In certain embodiments, the combined reformer and purifier comprises a catalyst effective to liberate hydrogen from said hydrogen-rich feedstock and forming a hydrogen-rich mixed gas, a purifier effective to receive the formed, hydrogen-rich mixed gas and extract a portion of the hydrogen contained therein as purified hydrogen, leaving a hydrogen-depleted raffinate, a burner or oxidative catalytic reactor configured to oxidize said hydrogen-depleted raffinate or said hydrogen-rich feedstock to supply heat to said catalyst bed; and wherein the purifier further comprises at least one hydrogen-permeable membrane positioned between two compression plates, and at least one of said compression plates comprises an assembly comprising at least one cavity comprising said catalyst, and at least one cavity effective to transmit heat from said burner or oxidative catalytic reactor to the at least one cavity containing said catalyst.

In certain configurations, the at least one cavity effective to transmit heat from said burner or oxidative catalytic reactor to the at least one cavity comprising said catalyst comprises at least a portion of said burner or oxidative catalytic reactor, where the cavity has one closed end. In other configurations, at least one of said compression plates or compression plate assemblies comprises at least one cavity comprising a methanation catalyst, and said purified hydrogen passes through the at least one cavity comprising said methanation catalyst effective to convert carbon monoxide into methane. In some configurations, at least one of said compression plates or compression plate assemblies has an interior surface proximal to said membrane and an exterior surface distal to said membrane, and said compression plate or compression plate assemblies comprises at least one cavity, interior surface, or exterior surface effective to preheat said hydrogen-rich feedstock prior to being delivered to said catalyst bed. In other instances, at least one of said compression plates or compression plate assemblies comprises an interior surface proximal to said membrane and an exterior surface distal to said membrane, and a substantially planar heat spreading member thermally coupled to said interior surface proximal to said membrane. In certain examples, the in-plane thermal conductivity of said substantially planar heat spreading member is in excess of 75 W/m-K or in excess of 200 W/m-K.

In some embodiments, the combined reformer and purifier comprises a spark or heat source effective to initiate oxidation of a fuel and oxidant provided to said burner or oxidative catalytic reactor. In certain examples, the spark or heat source is located, at least in part, within the at least one cavity effective to transmit heat from said burner or oxidative catalytic reactor to the at least one cavity containing said catalyst.

In other embodiments, the combined reformer and purifier at least one particulate filter effective to retain said catalyst or oxidative catalytic reactor within said respective cavities. In some instances, the combined reformer and purifier comprises at least one particulate filter effective to retain said methanation catalyst in the at least one cavity comprising said methanation catalyst.

In certain examples, the combined reformer and purifier comprises at least one compression sealing member positioned between said compression plates or compression plate assemblies. In some instances, the compression plate assembly comprises a first compression plate, and at least a second member defining or having at least one of said cavities, and where the first compression plate and said at least second member defining or having at least one of said cavities are joined or compressed together to form a unitary assembly.

In another aspect, a combined reformer and purifier for converting a hydrogen-rich feedstock into purified hydrogen comprises a catalyst effective to liberate hydrogen from said hydrogen-rich feedstock and forming a hydrogen-rich mixed gas, wherein the purifier is effective to receive the hydrogen-rich mixed gas and extract a portion of the hydrogen therein as purified hydrogen, leaving a hydrogen-depleted raffinate, and the purifier comprises at least one hydrogen-permeable membrane and at least one compression seal positioned between two compression plates, wherein at least one of said compression plates is an assembly comprising at least one cavity, e.g., first cavity, comprising a catalyst effective to liberate hydrogen from said hydrogen-rich feedstock and forming a hydrogen-rich mixed gas, at least one cavity, e.g., a second cavity, enclosing a burner or oxidative catalytic reactor to oxidize said hydrogen-depleted raffinate or said hydrogen-rich feedstock to supply heat to the at least one cavity comprising said catalyst, and an interior surface proximal to said membrane and an exterior surface distal to said membrane, and said compression plate has at least one additional cavity, interior, or exterior surface effective to preheat said hydrogen-rich feedstock prior to being delivered to said catalyst bed.

In certain embodiments, at least one of said compression plates or compression plate assemblies comprises at least one additional cavity comprising a methanation catalyst, and said purified hydrogen passes through the at least additional cavity comprising a methanation catalyst effective to convert carbon monoxide into methane. In some examples, at least one of said compression plates or compression plate assemblies comprises an interior surface proximal to said membrane and an exterior surface distal to said membrane, and a substantially planar heat spreading member is thermally coupled to said interior surface proximal to said membrane. In other instances, the in-plane thermal conductivity of said substantially planar heat spreading member is preferably in excess of 75 W/m-K, and most preferably in excess of 200 W/m-K.

In certain examples, the combined device comprises a spark or heat source effective to initiate oxidation of a fuel and oxidant provided to said burner or oxidative catalytic reactor. In other examples, the combined device comprises at least one particulate filter effective to retain said catalyst, or oxidative catalytic reactor within said respective cavities. In some examples, the combined device comprises at least one particulate filter effective to retain said methanation catalyst in the at least one cavity containing said methanation catalyst. In certain examples, the compression plate assembly comprises a first compression plate, and at least a second member defining or having at least one of said cavities, and where the first compression plate and said at least second member defining or having at least one of said cavities are joined or compressed together to form a unitary assembly.

In an additional aspect, a combined reformer and purifier for converting a volume of hydrogen-rich feedstock into purified hydrogen, comprising a catalyst effective to liberate hydrogen from said hydrogen-rich feedstock and forming a hydrogen-rich mixed gas, where the purifier is effective to receive the hydrogen-rich mixed gas and extract a first volume of the hydrogen therein as substantially purified hydrogen, leaving a hydrogen-depleted raffinate in a second volume, and wherein the purifier further comprises at least one hydrogen-permeable membrane; the combined reformer and purifier housed within a thermally integrated metallic assembly comprising multiple cavities, wherein at least one cavity comprises said catalyst, at least one cavity comprises said purifier, and at least one cavity comprises a burner or oxidative catalytic reactor to oxidize said hydrogen-depleted raffinate of said second volume or said volume of hydrogen-rich feedstock to supply heat to the at least one cavity.

In certain examples, at least one cavity comprises a methanation catalyst, and said purified hydrogen of said first volume is provided to the at least one cavity containing the methanation catalyst effective to convert carbon monoxide into methane. In other examples, a heat spreading member is thermally coupled to the thermally integrated metallic assembly. In some embodiments, the thermal conductivity is in excess of 75 W/m-K or in excess of 200 W/m-K in at least one planar axis. In some examples, the combined reformer and purifier comprises a spark or heat source effective to initiate oxidation of a fuel and oxidant provided to said burner or oxidative catalytic reactor. In other examples, combined reformer and purifier comprises at least one particulate filter. In some embodiments, the thermally integrated metallic assembly is comprised of more than one metallic member, and wherein said multiple metallic members are joined or compressed together to form a unitary, thermally integrated assembly.

In another aspect, an integrated reformer and purifier assembly configured to receive an impure feedstock gas comprising hydrogen at an input port, the assembly configured to liberate the hydrogen from the impure feedstock gas internally within the assembly and purify the liberated hydrogen within the assembly to provide the purified hydrogen at an output port of the assembly.

In certain embodiments, the assembly comprises a catalyst effective to liberate hydrogen from said hydrogen-rich feedstock and forming a hydrogen-rich mixed gas, a purifier effective to receive the formed, hydrogen-rich mixed gas and extract a portion of the hydrogen contained therein as purified hydrogen, leaving a hydrogen-depleted raffinate, a burner or oxidative catalytic reactor configured to oxidize said hydrogen-depleted raffinate or said hydrogen-rich feedstock to supply heat to said catalyst bed, wherein the purifier further comprises at least one hydrogen-permeable membrane positioned between two compression plates, and at least one of said compression plates comprises an assembly comprising at least one cavity comprising said catalyst, and at least one cavity effective to transmit heat from said burner or oxidative catalytic reactor to the at least one cavity containing said catalyst.

In other embodiments, at least one cavity is effective to transmit heat from said burner or oxidative catalytic reactor to the at least one cavity comprising said catalyst comprises at least a portion of said burner or oxidative catalytic reactor. In some examples, at least one of said compression plates or compression plate assemblies comprises at least one cavity comprising a methanation catalyst, and said purified hydrogen passes through the at least one cavity comprising said methanation catalyst effective to convert carbon monoxide into methane. In other examples, at least one of said compression plates or compression plate assemblies has an interior surface proximal to said membrane and an exterior surface distal to said membrane, and said compression plate or compression plate assemblies comprises at least one cavity, interior surface, or exterior surface effective to preheat said hydrogen-rich feedstock prior to being delivered to said catalyst bed. In some embodiments, at least one of said compression plates or compression plate assemblies comprises an interior surface proximal to said membrane and an exterior surface distal to said membrane, and a substantially planar heat spreading member thermally coupled to said interior surface proximal to said membrane. In additional examples, the in-plane thermal conductivity of said substantially planar heat spreading member is preferably in excess of 75 W/m-K or in excess of 200 W/m-K. In other configurations, the assembly comprises a spark or heat source effective to initiate oxidation of a fuel and oxidant provided to said burner or oxidative catalytic reactor. In some examples, the spark or heat source is located, at least in part, within the at least one cavity effective to transmit heat from said burner or oxidative catalytic reactor to the at least one cavity containing said catalyst. In some configurations, the assembly comprises at least one particulate filter effective to retain said catalyst or oxidative catalytic reactor within said respective cavities. In other configurations, the assembly comprises at least one compression sealing member positioned between said compression plates or compression plate assemblies.

In an additional aspect, a reformer with a catalyst for converting a hydrogen-rich feedstock into liberated hydrogen comprises a metallic body with at least one cavity comprising said catalyst, and at least one cavity effective to transmit heat from a burner or oxidative catalytic reactor to the at least one cavity containing said catalyst effective to liberate hydrogen from said hydrogen-rich feedstock and forming a hydrogen-rich mixed gas, where the at least one cavity effective to transmit heat from a burner or oxidative catalytic reactor is closed at one end to the flow of gases; and the reformer further comprises at least one cavity, interior, or exterior surface of said thermally metallic body effective to preheat said hydrogen-rich feedstock prior to being delivered to said catalyst bed.

In certain embodiments, the reformer further comprises a hydrogen purifier with at least one hydrogen-permeable membrane positioned between two compression plates for the production of substantially pure hydrogen, and one of the compression plates comprises said metallic body noted above or herein. In other instances, at least one of said compression plates comprises at least one cavity comprising a methanation catalyst, and said substantially pure hydrogen passes through the at least one cavity comprising said methanation catalyst effective to convert carbon monoxide into methane. In some examples, a heat spreading member is thermally coupled to said metallic body. In other examples, the thermal conductivity of said heat spreading member is preferably in excess of 75 W/m-K, and most preferably in excess of 200 W/m-K in at least one plane. In other instances, the reformer may comprise a spark or heat source effective to initiate oxidation of a fuel and oxidant provided to said burner or oxidative catalytic reactor. In additional configurations, the reformer may comprise at least one particulate filter effective to retain said catalyst or oxidative catalytic reactor within said respective cavities. In other instances, a combined reformer and purifier with a methanation catalyst as described herein may further comprise at least one particulate filter effective to retain said methanation catalyst in the at least one cavity comprising said methanation catalyst. In some examples, a combined reformer and purifier as described herein further comprises at least one compression sealing member positioned between said compression plates.

Additional aspects, embodiments and configurations are also described herein.

BRIEF DESCRIPTION OF THE DRAWINGS

Certain illustrative configurations and embodiments will become more apparent from the following detailed description taken with respect to the accompanying drawings in which.

DETAILED DESCRIPTION

Figure 1:
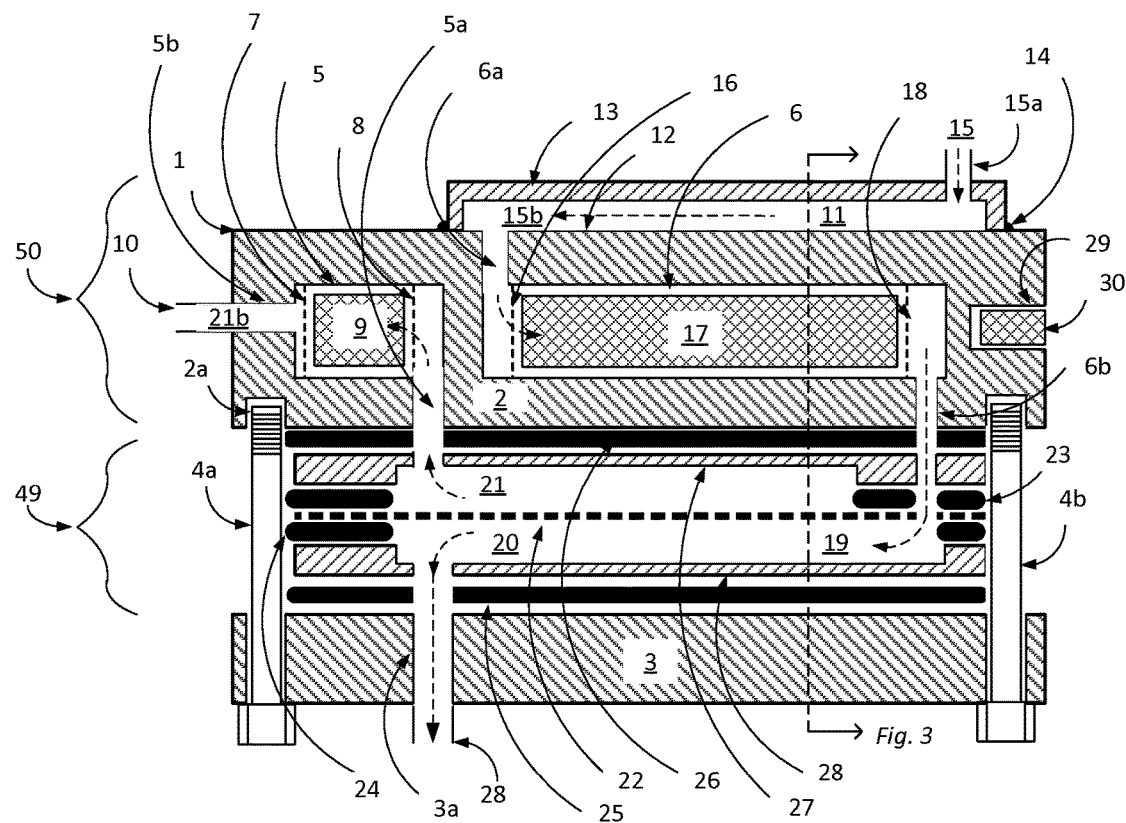
FIG. 1 illustrates a cross section of an integrated reformer and purifier including a catalyst cavity, methanation cavity, boiler cavity, and standby heater.

Certain embodiments of a combined reformer and purifier are now described. It will be recognized by the person of ordinary skill in the art, given the benefit of this disclosure, that substitutions, modifications and alterations of the described embodiments are possible without and encompassed by the claims. Certain configurations below refer to purified hydrogen. The purified hydrogen need not be 100% pure and may, for example, comprise at least about 95% or more hydrogen, e.g., 99% or more hydrogen or 99.5% or more hydrogen or even 99.9% or more hydrogen. Certain configurations may provide desired thermal conductivity measurements, e.g., the in-plane thermal conductivity of a substantially planar heat spreading member is preferably in excess of 75 W/m-K, and most preferably in excess of 200 W/m-K. Thermal conductivity may be measured using numerous tests including, for example, ASTM D5470 dated 2012.

Reformers based on catalytic conversion of hydrogen-rich feedstock, with subsequent hydrogen purification, are well-known in the art. For example, in U.S. Pat. No. 6,348,278 B1 a catalyst bed followed by a hydrogen purifier to extract hydrogen from the hydrogen-rich gas is shown. Such hydrogen purifiers often utilize membranes of palladium alloys such as palladium-copper or palladium-silver for separation of the hydrogen from the mixed hydrogen-rich gases exiting the catalyst bed. Typically, reformers will utilize a burner for supplying heat for pre-heating the fuel and supplying heat for the reforming reaction, a catalyst bed, a purifier for separating and purifying the hydrogen, and a methanation catalyst bed for further purifying the hydrogen and converting any remaining carbon monoxide to methane. In some cases reformers do not utilize a purifier, but rather send a somewhat impure mixed gas to a fuel cell for power generation. In these cases the fuel cell must be tolerant to trace amounts of carbon monoxide.

Some attempts have been made to build compact reformers, particularly for very small applications. Kim et. al, in US 2007/0087235 A1 discloses a micro multi-layered thin film hydrogen fuel cell system which includes plates with reforming catalyst and plates for boiling/preheating the fuel, along with a plate for burning the fuel. In the center of the assembly resides a high-temperature, CO tolerant fuel cell for generating power, which as disclosed must operate in the 150-250° C. range. While this provides for a compact system, it limits the type of fuel and reaction temperatures in the system to a range that precludes the use of a palladium-based hydrogen purification membrane, and requires the use of a particular type of fuel cell.

These shortcomings are partially addressed by C. Krueger in U.S. Pat. No. 7,182,917 B2, where a reactor/purifier for generating pure hydrogen in a stack or array of pairs of alternatingly connected high and low pressure reactor chambers is disclosed. In this invention a gas-porous turbulence-promoting screen structure wash coated with a steam-reforming catalyst is sandwiched between a planar hydrogen-selective palladium alloy membrane and a planar gas-impermeable heat-conducting metal plate within the high pressure reactor chamber of each high pressure reactor chamber; and the catalyst-coated structure in each high pressure chamber is reacted with steam and hydrocarbon fuel between about 200° C. to 650° C. to produce hydrogen and carbon oxides within an isothermal temperature range in each high pressure reactor chamber, while simultaneously permeating pure hydrogen therefrom through the membrane into the corresponding connected low pressure reactor chamber.

In U.S. Pat. No. 6,033,634, M. Koga discloses a multi-component plate reactor, where the reforming reaction takes place in a cavity formed by a corrugated metal sheet with a perimeter seal, with a hydrogen-permeable membrane next to the catalyst to purify the hydrogen, and heated gas from a separate burner providing heat to the corrugated metal sheet from the other side (FIG. 6). Heat transfer therefore occurs through the corrugated sheet. The compression means for the assembly are not shown or discussed. As may be appreciated by one skilled in the art, the arrangement of M. Koga has limitations in that the proximity of the membrane next to a loose reforming catalyst may cause perforation or abrasion of the membrane, as well as wide variations in temperature between the reforming inlet and exit at the catalyst bed/membrane cavity. Further, loading of the catalyst into the illustrated cavity may prove to be quite difficult.

In U.S. Pat. No. 9,017,436 B2 Chen et. al disclose a thermally conductive monolithic block with various cavities for placing catalyst, burners, and heaters for production of hydrogen. The disclosure specifically describes a conduit for the combustion extending through the monolithic block. Less specifically, the disclosure generically mentions combining the hydrogen producing assembly with an external hydrogen purifier in fluid communication with the monolithic block, or alternatively including the hydrogen purifier as part of the hydrogen producing assembly. However, means for mechanically and thermally integrating the purifier into the hydrogen producing assembly in a sealing fashion are not disclosed. Furthermore, the disclosure illustrates the combustion heat transfer conduit as extending through the monolithic block with an inlet and an exit, which in some cases may not be desirable in forming a compact fuel processing system, as it may be preferable to form a single, closed-ended opening in a monolithic block which serves as both an inlet and an exit. An improvement in the art is therefore necessary to provide an effective combination of the purifier and monolithic block with compression sealing means, as well as the elimination of the combustion conduit extending through the monolithic block.

While the aforementioned disclosures provide some improvements to the art, there still remains a need to combine the functionality of a heat-producing reaction (burner or catalytic oxidative reactor), with an endothermic reforming reaction and a membrane purifier, in a single, mechanically and thermally integrated reformer and purifier.

Referring now to FIG. 1, combined reformer and purifier 1 with compression plate assembly 50 is configured to receive hydrogen-rich feedstock 15 through entry passage 15a into boiler cavity 11. Hydrogen-rich feedstock 15 can be supplied at elevated pressure, preferably at least at 5 Bar gauge pressure, and most preferably at or above 10 Bar gauge pressure. Hydrogen-rich feedstock 15 may consist of any constituents which may be reformed to release gaseous hydrogen, such as, for example, a mix of methanol and water. Hydrogen-rich feedstock materials, such as ammonia, do not require the addition of water for the reforming step and may be utilized in the present invention. Boiler cavity 11 is bounded on one side by boiler plate 13 and compression plate 12 on the other side. Boiler plate 13 and compression plate 12 are joined together in a sealing fashion, illustrated as perimeter weld 14. Other means for fastening boiler plate 13 and compression plate 12 in sealing fashion may be utilized, such as with brazing, welding, bolts with compression gaskets, and the like. Hydrogen rich feedstock 15 is heated in boiler cavity 11, yields heated hydrogen rich feedstock 15b, which travels through catalyst cavity inlet passage 6a, arriving in catalyst cavity 6. Catalyst cavity 6 may comprise a reforming catalyst 17, and reforming catalyst inlet screen 16 and reforming catalyst exit screen 18 act as particulate filters to keep the reforming catalyst 17 in catalyst cavity 6. Reforming catalyst 17 liberates hydrogen from heated hydrogen-rich feedstock 15b, forming hydrogen-rich mixed gas 19, which exits catalyst cavity 6 through catalyst cavity exit passage 6b. While illustrated as a pellet-type catalyst, it is within the scope of this configuration that reforming catalyst 17 may also be a catalyst coating (not shown) on the walls of catalyst cavity 6 in both cases catalyst cavity 6 will comprise a reforming catalyst 17.

In FIG. 1, purifier 49 comprises hydrogen permeate plate 27, raffinate flow plate 28, hydrogen compression gasket 23, raffinate compression gasket 24 and hydrogen-permeable membrane 22. Purifier 49 can be held in compressive sealing fashion between compression plate 2 and lower compression plate 3, with perimeter bolts shown as perimeter bolts 4a and 4b. Perimeter bolts 4a and 4b thread into compression plate 2, which can be formed with integral threads 2a. In other embodiments (not shown), perimeter bolts 4a and 4b may extend completely though compression plate 2, and nuts may be alternatively utilized to supply compressive force. Upper purifier sealing gasket 26 is operative to seal methanator inlet passageway 5a and catalyst cavity exit passage 6b with purifier 49, as well as permeated hydrogen 21, and may be formed from a variety of materials including, for example, vermiculite or exfoliated graphite. Upper purifier sealing gasket 26 can desirably be formed from exfoliated graphite with a high in-plane thermal conductivity, which then may act as a heat spreader for compression plate 2. In this embodiment, purifier sealing gasket 26 is formed from exfoliated graphite and is relatively thick. Lower purifier gasket 25 may also be used as a heat spreader if desired. While not illustrated, multiple hydrogen-permeable membranes 22 may be utilized. Various purifier assemblies utilizing single and multiple membranes in stacked arrangements are well-known in the art. The description of purifier 49 therefore is illustrative only, and the specific arrangement shown in the Figures does not imply any limitation on the purifiers described herein.

As further shown in FIG. 1, purifier 49 is configured to receive hydrogen-rich mixed gas 19, and hydrogen permeates through hydrogen-permeable membrane 22 as permeated hydrogen 21. Various hydrogen-permeable membrane materials are well known in the art, and may consist of palladium alloy foils, for example. Hydrogen-rich mixed gas 19, after losing permeated hydrogen 21, becomes hydrogen-depleted raffinate 20. Permeated hydrogen 21 exits purifier 49 through methanator inlet passageway 5a into methanator cavity 5. Hydrogen-depleted raffinate 20 exits purifier 49 through raffinate exit passageway 3a, and subsequently exits combined reformer and purifier 1 through raffinate exit 28. Methanation catalyst 9, present in methanator cavity 5, is bound by methanation catalyst inlet screen 8 and methanation catalyst exit screen 7, which act as particulate filters and keep methanation catalyst 9 in methanator cavity 5. Permeated hydrogen 21 passes through methanation catalyst 9 in methanator cavity 5, forming purified hydrogen 21b, travels through methanator exit passage 5b and exits combined reformer and purifier 1 at purified hydrogen exit 10.

In some applications is may be desirable to maintain combined reformer and purifier 1 in a heated state in a standby mode, such that warmup time to the desired operating (producing hydrogen) temperature of reformer and purifier 1 of approximately between 250° C. and 600° C. can be minimized or eliminated. Preferred operating temperatures are highly dependent on the type of membrane material used for hydrogen-permeable membrane 22, composition of hydrogen-rich feedstock 15 (methanol/water, ammonia, natural gas/water, etc.), and the composition of reforming catalyst 17 (Cu/ZnO, Pt, etc.). In order to supply heat in a standby mode, electric heater 30 is illustrated in FIG. 1, residing in heater cavity 29.

Figure 2:
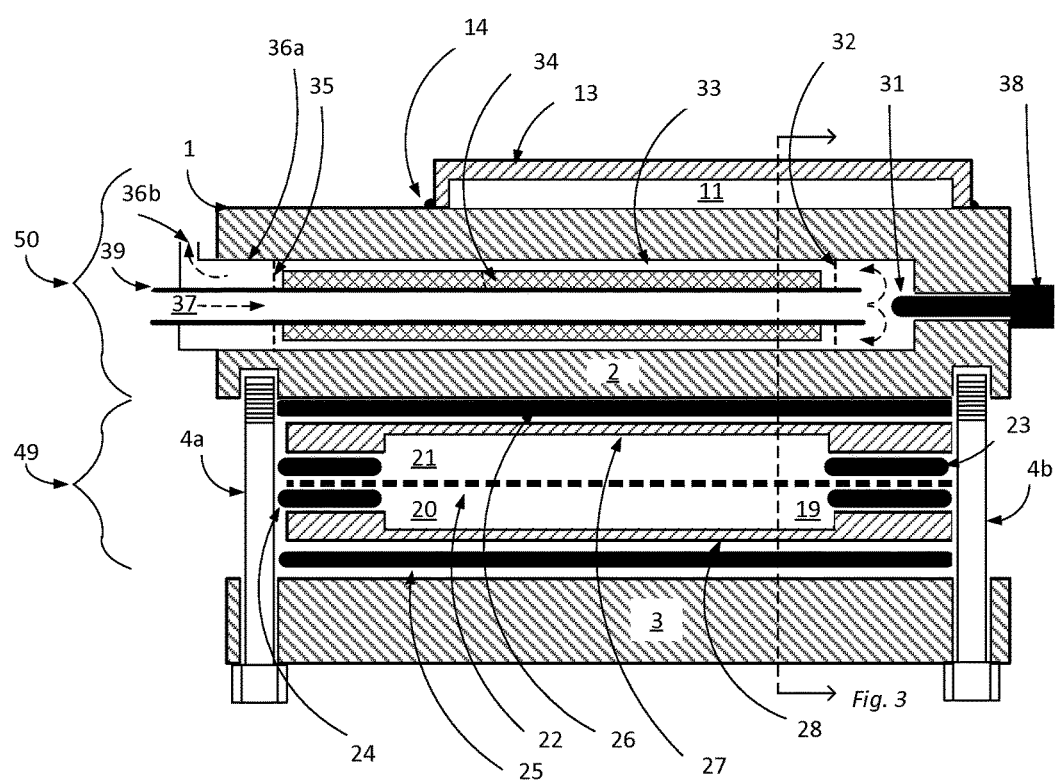
FIG. 2 illustrates a cross section of an integrated reformer and purifier including a burner cavity, boiler, and an ignition source.

Referring now to FIG. 2, the same combined reformer and purifier 1 with compression plate assembly 50 shown in FIG. 1 is illustrated at a slightly different cross-section. Boiler cavity 11 is bounded on one side by boiler plate 13 and compression plate 2 on the other side. Boiler plate 13 and compression plate 2 are joined together in sealing fashion, illustrated as perimeter weld 14.

In FIG. 2, a purifier 49 comprises hydrogen permeate plate 27, raffinate flow plate 28, hydrogen compression gasket 23, raffinate compression gasket 24 and hydrogen-permeable membrane 22. Purifier 49 is held in compressive sealing fashion between compression plate 2 and lower compression plate 3, with perimeter bolts shown as perimeter bolts 4a and 4b and purifier sealing gasket 26 and lower purifier gasket. Purifier 49 is configured to receive hydrogen-rich mixed gas 19, and hydrogen permeates through hydrogen-permeable membrane 22 as permeated hydrogen 21. Hydrogen-rich mixed gas 19, after losing permeated hydrogen 21, becomes hydrogen-depleted raffinate 20.

Compression plate 2 comprises a burner cavity 33 which is essentially close-ended, which supplies heat to compression plate 2. While not constrained to any particular arrangement, in FIG. 2 burner cavity 33 is annular and comprises a burner delivery tube 39 at the center of burner cavity 33, the latter which is surrounded by oxidizing catalyst 34. Oxidizing catalyst 34 is bounded on two sides by oxidizing catalyst inlet screen 32 and oxidizing catalyst exit screen 35, which may act as a particulate filter if oxidizing catalyst 34 is a loose pellet-based material, as well as serving to keep oxidizing catalyst 34 in its desired location. Oxidizing catalyst 34, for example, may consist of platinum on a suitable carrier. While disclosed as a pellet-type catalyst, it is within the scope of the technology described herein to utilize oxidizing catalyst 34 as a catalyst coating (not shown) on the walls of burner cavity 33 or delivery tube 39.

In certain embodiments, fuel and oxidant mix 37 are supplied to delivery tube 39, and fuel and oxidant mix travel down delivery tube 39 until reaching the end of delivery tube 39, at which point fuel and oxidant mix 37 reverses direction and travels to oxidizing catalyst 34 where a heat-producing reaction may occur. In some cases, flame burning may occur or be sustained prior to arrival at oxidizing catalyst 34. Fuel and oxidant mix 37 may be comprised of hydrogen-depleted raffinate 20 and air, or hydrogen-rich feedstock 15 and air, the latter which may be used to supply heat during warmup from a cold start. Igniter 38 with heated tip 31 may also be included to provide enough heat for initiating flame burning or assisting with catalytic light-off of oxidizing catalyst 34, protruding in a gas-tight fashion into closed-ended burner cavity 33. Burner exhaust 36a exits combined reformer and purifier 1 at burner exhaust exit 36b, after transmitting heat to compression plate 2.

Figure 3:
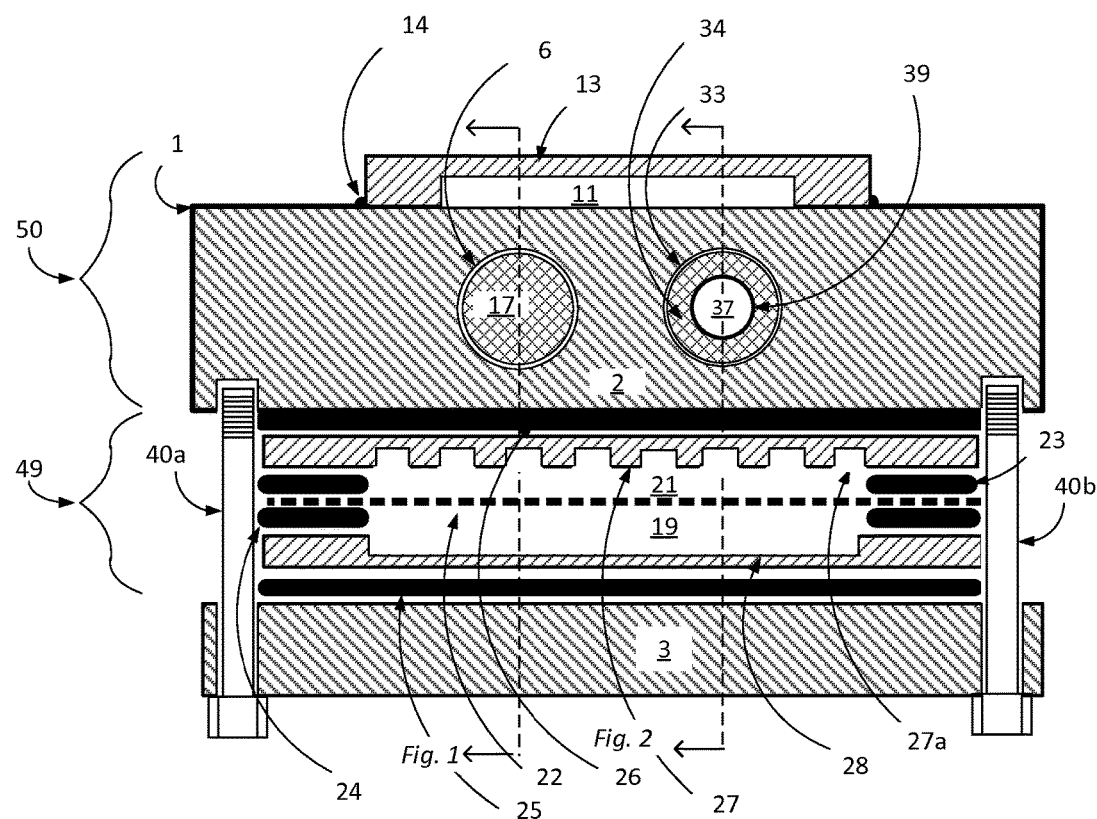
FIG. 3 illustrates a cross section of an integrated reformer and purifier including a boiler, catalyst, and burner cavities.

Referring now to FIG. 3, FIG. 3 shows a cutaway perpendicular to the representation shown in FIG. 1 and FIG. 2 of combined reformer and purifier 1. In FIG. 3, a boiler cavity 11 is bounded on one side by boiler plate 13 and compression plate 2 on the other side. Boiler plate 13 and compression plate 2 are joined together in sealing fashion, illustrated as perimeter weld 14.

Purifier 49 comprises hydrogen permeate plate 27, raffinate flow plate 28, hydrogen compression gasket 23, raffinate compression gasket 24 and hydrogen-permeable membrane 22. Hydrogen permeate plate 27 is shown with permeate channels 27a, which allows for mechanical support of hydrogen-permeable membrane 22, since permeated hydrogen 21 will be at a lower pressure than hydrogen-rich mixed gas 19. Purifier 49 is held in compressive sealing fashion between compression plate 2 and lower compression plate 3, with perimeter bolts shown as perimeter bolts 40a and 40b. Upper purifier sealing gasket 26 serves to seal methanator inlet passageway 5a (FIG. 1) and catalyst cavity exit passage 6b (FIG. 1) with purifier 49, as well as permeated hydrogen 21. Upper purifier sealing gasket 26 and lower purifier gasket 25 may also be used as a heat spreader if desired.

Compression plate 2 comprises a burner cavity 33 which is closed-ended, which supplies heat to compression plate 2, which in turn supplies heat to boiler cavity 11 and catalyst cavity 6, which comprises a reforming catalyst 17. Burner cavity 33 is annular and comprises a burner delivery tube 39 at the center of burner cavity 33, the latter which is surrounded by oxidizing catalyst 34.

Figure 4:
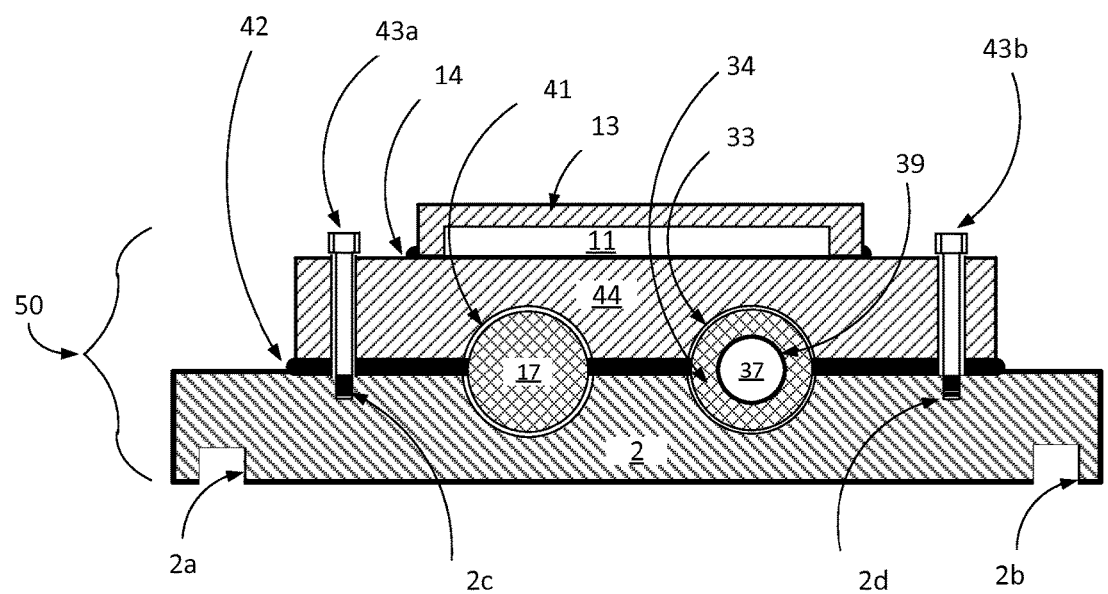
FIG. 4 details a cross section similar to FIG. 3, where multiple pieces are utilized to form an assembly.

FIG. 4 shows an alternate arrangement of compression plate assembly 50. This alternate arrangement may be desirable compared to the arrangement shown in FIGS. 1-3, as it may, for example, be easier to form and/or assemble the parts as illustrated in FIG. 4. Compression plate 2 and secondary plate 44 are compressed together with compressive plate sealing gasket 42, using compression screws 43a and 43b, which thread into compression plate 2 at threaded holes 2c and 2d, respectively, and where compression plate 2 has threaded holes 2a, 2b, 2c, and 2d. Boiler cavity 11 is formed by boiler plate 13 and the top surface of secondary plate 44. Boiler plate 13 and secondary plate 44 are joined together in sealing fashion, illustrated as perimeter weld 14. Compression plate 2 combined with secondary plate 44 serve to define burner cavity 33, which supplies heat to compression plate 2 and secondary plate 44, which in turn supplies heat to boiler cavity 11 and catalyst cavity 6, which comprises a reforming catalyst 17. Burner cavity 33 is annular and closed-ended and comprises a burner delivery tube 39 at the center of burner cavity 33, the latter which is surrounded by oxidizing catalyst 34. Fuel and oxidant mix 37 is at the center of burner delivery tube 39. The compression plate assembly 50 shown in FIG. 4 is functionally equivalent to the compression plate assemblies 50 shown in FIGS. 1-3.

As noted herein, certain configurations of a combined catalyst bed and purifier provide desirable attributes including, but not limited to, thermal and mechanical integration of the function of reforming and purification into a more compact and efficient system.

What is claimed is:

1. A combined reformer and purifier for converting a hydrogen-rich feedstock into purified hydrogen, comprising a catalyst effective to liberate hydrogen from said hydrogen-rich feedstock and forming a hydrogen-rich mixed gas, wherein the purifier is effective to receive the hydrogen-rich mixed gas and extract a portion of the hydrogen therein as purified hydrogen, leaving a hydrogen-depleted raffinate, and the purifier comprises at least one hydrogen-permeable membrane and at least one compression seal positioned between two compression plates, wherein at least one of said compression plates is an assembly comprising:

at least one first cavity comprising a catalyst effective to liberate hydrogen from said hydrogen-rich feedstock and forming a hydrogen-rich mixed gas;

at least one second cavity enclosing a burner or oxidative catalytic reactor to oxidize said hydrogen-depleted raffinate or said hydrogen-rich feedstock to supply heat to the at least one first cavity containing said catalyst, said second cavity closed at one end to the flow of gases; and an interior surface proximal to said membrane and an exterior surface distal to said membrane, and wherein said at least one of said compression plates has a third cavity effective to preheat said hydrogen-rich feedstock prior to being delivered to said catalyst.

2. A combined reformer and purifier for converting a hydrogen-rich feedstock into purified hydrogen as claimed in claim 1, where at least one of said compression plates or compression plate assemblies comprises an interior surface proximal to said membrane and an exterior surface distal to said membrane, and a substantially planar heat spreading member is thermally coupled to said interior surface proximal to said membrane.

3. A combined reformer and purifier for converting a hydrogen-rich feedstock into purified hydrogen as claimed in claim 2, wherein the in-plane thermal conductivity of said substantially planar heat spreading member is preferably in excess of 75 W/m-K, and most preferably in excess of 200 W/m-K.

4. A combined reformer and purifier for converting a hydrogen-rich feedstock into purified hydrogen as claimed in claim 1, wherein at least one of said compression plates or compression plate assemblies comprises at least one cavity comprising a methanation catalyst, and said purified hydrogen passes through at least one fourth cavity comprising a methanation catalyst effective to convert carbon monoxide into methane.

5. A combined reformer and purifier for converting a hydrogen-rich feedstock into purified hydrogen as claimed in claim 4, further comprising at least one particulate filter effective to retain said methanation catalyst in the at least one cavity containing said methanation catalyst.

6. A combined reformer and purifier for converting a hydrogen-rich feedstock into purified hydrogen as claimed in claim 1, further comprising a spark or heat source effective to initiate oxidation of a fuel and oxidant provided to said burner or oxidative catalytic reactor.

7. A combined reformer and purifier for converting a hydrogen-rich feedstock into purified hydrogen as claimed in claim 1, further comprising at least one particulate filter effective to retain said catalyst, or oxidative catalytic reactor within said respective cavities.

8. A combined reformer and purifier for converting a hydrogen-rich feedstock into purified hydrogen as claimed in claim 1, wherein said compression plate assembly comprises a first compression plate, and at least a second member defining or having at least one of said cavities, and where the first compression plate and said at least second member defining or having at least one of said cavities are joined or compressed together to form a unitary assembly.

9. A combined reformer and purifier for converting a hydrogen-rich feedstock into purified hydrogen as claimed in claim 1, wherein said assembly is comprised of multiple metallic members, and wherein said multiple metallic members are joined or compressed together to form a unitary, thermally integrated assembly.

* * * * *